United States Patent
Towers et al.

(10) Patent No.: US 10,551,557 B2
(45) Date of Patent: Feb. 4, 2020

(54) OPTICAL WAVEGUIDE MOUNT

(71) Applicant: MICROSOFT TECHNOLOGY LICENSING, LLC, Redmond, WA (US)

(72) Inventors: Christopher Robert Towers, Seattle, WA (US); David Douglas Bohn, Fort Collins, CO (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/853,590

(22) Filed: Dec. 22, 2017

(65) Prior Publication Data

US 2019/0196095 A1    Jun. 27, 2019

(51) Int. Cl.
*F21V 8/00* (2006.01)
*G02B 7/02* (2006.01)

(52) U.S. Cl.
CPC .............. *G02B 6/0093* (2013.01); *G02B 7/02* (2013.01)

(58) Field of Classification Search
None
See application file for complete search history.

(56) References Cited

U.S. PATENT DOCUMENTS

| | | | |
|---|---|---|---|
| 5,327,517 A * | 7/1994 | Yamada | G02B 6/30 385/137 |
| 5,596,671 A | 1/1997 | Rockwell, III | |
| 5,850,498 A | 12/1998 | Shacklette et al. | |
| 7,062,132 B2 | 6/2006 | Basavanhally et al. | |
| 8,576,143 B1 | 11/2013 | Kelly | |
| 8,605,008 B1 | 12/2013 | Prest et al. | |
| 9,435,952 B2 | 9/2016 | Stephens et al. | |
| 2003/0118309 A1 * | 6/2003 | Uno | G02B 6/136 385/129 |
| 2005/0206838 A1 | 9/2005 | Chow | |
| 2006/0233500 A1 * | 10/2006 | Yamauchi | G02B 6/3806 385/95 |
| 2006/0291777 A1 * | 12/2006 | Nishizawa | G02B 6/421 385/33 |
| 2009/0136192 A1 * | 5/2009 | Shimizu | G02B 6/12004 385/131 |
| 2011/0044069 A1 * | 2/2011 | Sato | G02B 6/4201 362/551 |

(Continued)

FOREIGN PATENT DOCUMENTS

WO    0135133 A1    5/2001

OTHER PUBLICATIONS

Hua, Hong, "Sunglass-Like Displays Become a Reality with Free-Form Optical Technology", In Proceedings of SPIE Newsroom, Aug. 20, 2012, 3 Pages.

(Continued)

*Primary Examiner* — Tina M Wong
(74) *Attorney, Agent, or Firm* — Newport IP, LLC; Tim R. Wyckoff (57) ABSTRACT

Disclosed optical mounts are resistant to the various stresses that may be experienced by optical display devices. An optical mount is provided with mechanical compliance and resiliency. Such mechanical compliance and resiliency associated with the disclosed optical mounts are intended to absorb thermal and/or mechanical stresses, while protecting and preserving the operational functionality of optical waveguides coupled to the disclosed optical mounts.

17 Claims, 5 Drawing Sheets

(56) References Cited

U.S. PATENT DOCUMENTS

| | | |
|---|---|---|
| 2011/0241975 A1 | 10/2011 | Mukawa et al. |
| 2015/0253511 A1 | 9/2015 | Pelley |
| 2015/0277125 A1 | 10/2015 | Hirano et al. |
| 2015/0346434 A1* | 12/2015 | Kubota ................ G02B 6/3855 385/79 |
| 2016/0085092 A1 | 3/2016 | Calilung et al. |
| 2016/0274437 A1 | 9/2016 | Russo et al. |
| 2018/0001815 A1* | 1/2018 | Hundt ................... F21S 43/237 |

OTHER PUBLICATIONS

"International Search Report and Written Opinion Issued in PCT Application No. PCT/US18/063507", dated Mar. 22, 2019, 10 Pages.

\* cited by examiner

OPTICAL WAVEGUIDE MOUNT

BACKGROUND

Virtual reality (VR) and augmented reality (AR) visualization systems are starting to enter the mainstream consumer marketplace, such as in the form of head-mounted display (HMD) devices ("AR-HMD devices"). AR-HMD devices are a promising application of VR and AR technologies.

AR-HMD devices can be embodied in a wearable headset that is arranged to display an image within a short distance from a human eye. Some AR-HMD devices are provided with a frame which has a central portion fitting over a user's (wearer's) nose bridge and left and right support extensions which fit over a user's ears. Optical components are arranged in the frame so as to display an image within a few centimeters of the user's eyes. The image can be a computer-generated image on a display, such as a micro display. The optical components are arranged to transport light of the desired image which is generated on the display to the user's eye to make the image visible to the user. The display on which the image is generated can form part of a light engine, such that the image itself generates collimated light beams which can be guided by the optical component to provide an image visible to the user.

Different kinds of optical components have been used to convey the image from the display to the human eye. These can include lenses, mirrors, optical waveguides, holograms and diffraction gratings, for example. In some display systems, the optical components are fabricated using optics that allow the user to see the image, but not the "real world". Other types of display systems provide view-through optics, so that the generated image which is displayed to the user is overlaid onto a real-world view (i.e., AR).

Waveguide-based display systems typically transport light from a light engine to the eye via a TIR (Total Internal Reflection) mechanism in a waveguide (light guide). Such systems can incorporate diffraction gratings, which cause effective beam expansion so as to output expanded versions of the beams provided by the light engine. This means the image is visible over a wider area when looking at the waveguide's output than when looking at the light engine directly. Provided the eye is within an area such that it can receive some light from substantially all of the expanded beams, the whole image will be visible to the user. Such an area is referred to as an eye box.

Components of AR-HMD devices may require very precise positioning and alignment within the devices in order to function properly. Even minor mechanical or thermal stresses applied to these components (e.g., waveguides) can potentially affect the positioning or alignment of such components and thereby adversely affect functionality of the devices. Additionally, these components may be vulnerable to damage due to being dropped or other impacts, normal handling, or environmental factors.

It is with respect to these considerations and others that the disclosure made herein is presented.

SUMMARY

Techniques described herein relate to optical mounts. In some implementations, an optical mount is provided that is to receive an optical element. The optical element may be an optical waveguide. The optical mount that has the optical waveguide mounted thereto may be used with augmented reality (AR) head-mounted display (HMD) devices ("AR-HMD devices").

AR-HMD devices may comprise many components that create thermal stresses. Furthermore, AR-HMD devices may experience mechanical stresses, such as jarring forces that are created when AR-HMD devices are inadvertently dropped. The various stresses experienced by AR-HMD devices may damage the one or more optical elements implemented by such devices. For example, stresses experienced by the AR-HMD devices may damage (e.g., bow, warp, etc.) the one or more optical elements incorporated in the AR-HMD devices.

The various optical mounts disclosed herein are designed to be resistant to the various stresses that may be experienced by AR-HMD devices. Specifically, in some implementations, an optical mount is provided with mechanical compliance and resiliency. Such mechanical compliance and resiliency associated with the various optical mounts disclosed herein are intended to absorb and/or mitigate thermal and/or mechanical stresses that may be experienced by AR-HMD devices, while protecting and preserving the operational functionality of optical waveguides coupled to the disclosed optical mounts. The techniques disclosed herein can improve the clarity and accuracy of images produced by an optical device, by providing a mount that absorbs and mitigates thermal and other mechanical stresses that may be caused by the difference of thermal expansion coefficients between the optical device and the mount.

In some implementations, an optical waveguide mount is provided that includes a first body segment to receive and engage an optical waveguide; a first surface and a second surface disposed on the first body segment, the first surface and the second surface to receive and engage the optical waveguide; and at least one compliance joint disposed in the first body segment, the at least one compliance joint disposed between the first surface and the second surface, the at least one compliance joint allowing the first body segment to have an elasticity or compliance in a first direction of the first body segment, the elasticity or compliance is designed to mitigate bowing and/or warping of the optical waveguide due to stress experienced by the optical waveguide mount and/or the optical waveguide.

In other implementations, an optical mount is provided. The optical mount may include a first body segment to receive and engage an optical element; a first surface and a second surface disposed on the first body segment, the first surface and the second surface to receive and engage the optical element; and at least one compliance joint disposed in the first body segment, the at least one compliance joint disposed between the first surface and the second surface, the at least one compliance joint allowing the first body segment to have an elasticity or compliance.

In yet other implementations, a method includes providing an optical mount comprising at least a first surface and a second surface and at least one compliance joint disposed between the first surface and the second surface. The method may further include coupling an optical element to the first surface and the second surface. The at least one compliance joint allows the optical mount to have an elasticity or compliance in a first direction of the optical mount, the elasticity or compliance designed to mitigate bowing and/or warping of the optical element in the first direction of the optical mount due to stress experienced by the optical mount and/or the optical element.

It should be appreciated that, although described in relation to a system, the above-described subject matter may also be implemented as a computer-controlled apparatus, a computer process, a computing system, or as an article of manufacture such as a computer-readable medium and/or dedicated chipset. Among many other benefits, the techniques described herein improve efficiencies with respect to a wide range of computing resources. For instance, operations can be performed on two or more values, e.g., summing, multiplying or otherwise to perform a number of complex tasks, such as facial recognition, object recognition, image generation, classification detection, etc.

These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Techniques described herein relate to optical mounts. In some implementations, an optical mount is provided that is to receive an optical element. The optical element may be an optical waveguide. The optical mount that has the optical waveguide mounted thereto may be used with augmented reality (AR) head-mounted display (HMD) devices ("AR-HMD devices").

AR-HMD devices may comprise many components that create thermal stresses. Furthermore, AR-HMD devices may experience mechanical stresses, such as jarring forces that are created when AR-HMD devices are inadvertently dropped. The various stresses experienced by AR-HMD devices may damage the one or more optical elements implemented by such devices. For example, stresses experienced by the AR-HMD devices may damage (e.g., bow, warp, etc.) the one or more optical elements incorporated in the AR-HMD devices.

The optical mounts disclosed herein are designed to be resistant to the various stresses that may be experienced by AR-HMD devices. Specifically, in some implementations, an optical mount is provided with mechanical compliance and resiliency. Such mechanical compliance and resiliency associated with the various optical mounts disclosed herein are intended to absorb thermal and/or mechanical stresses that may be experienced by AR-HMD devices, while protecting and preserving the operational functionality of optical waveguides coupled to the disclosed optical mounts.

In some implementations, an optical waveguide mount is provided that includes a first body segment to receive and engage an optical waveguide; a first surface and a second surface disposed on the first body segment, the first surface and the second surface to receive and engage the optical waveguide; and at least one compliance joint disposed in the first body segment, the at least one compliance joint disposed between the first surface and the second surface, the at least one compliance joint allowing the first body segment to have an elasticity or compliance in a first direction of the first body segment, the elasticity or compliance is designed to mitigate bowing and/or warping of the optical waveguide due to stress experienced by the optical waveguide mount and/or the optical waveguide.

In other implementations, an optical mount is provided. The optical mount may include a first body segment to receive and engage an optical element; a first surface and a second surface disposed on the first body segment, the first surface and the second surface to receive and engage the optical element; and at least one compliance joint disposed in the first body segment, the at least one compliance joint disposed between the first surface and the second surface, the at least one compliance joint allowing the first body segment to have an elasticity or compliance.

In yet other implementations, a method includes providing an optical mount comprising at least a first surface and a second surface and at least one compliance joint disposed between the first surface and the second surface. The method may further include coupling an optical element to the first surface and the second surface. The at least one compliance joint allows the optical mount to have an elasticity or compliance in a first direction of the optical mount, the elasticity or compliance designed to mitigate bowing and/or warping of the optical element in the first direction of the optical mount due to stress experienced by the optical mount and/or the optical element.

Figure 1:
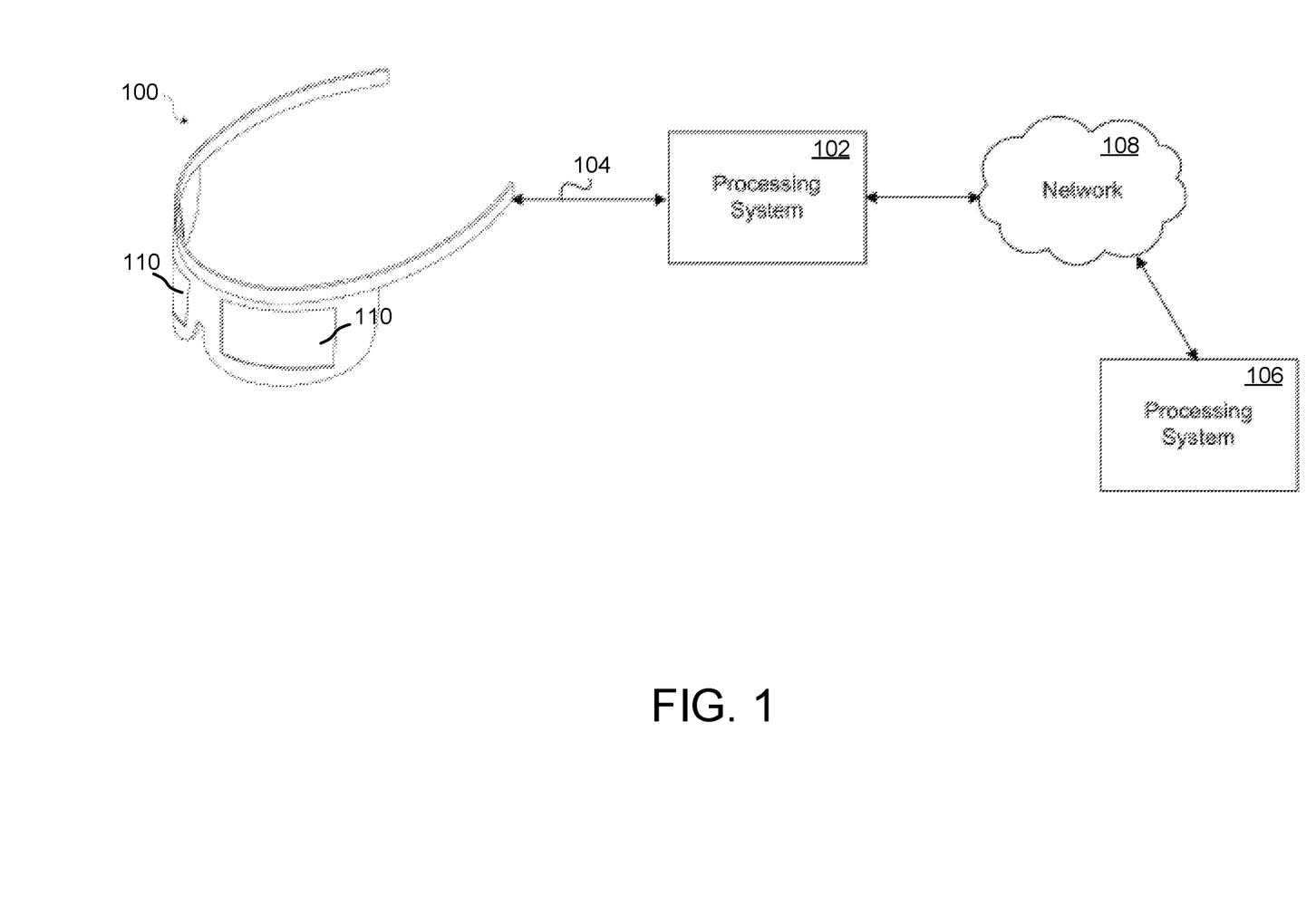
FIG. 1 schematically shows an example of an environment in which augmented reality (AR) head-mounted display (HMD) devices ("AR-HMD devices") may be used.

FIG. 1 schematically shows an example of an environment in which AR-HMD devices may be used. In the illustrated example, an AR-HMD device 100 is configured to communicate data to and from an external processing system 102 through a connection 104, which can be a wired connection, a wireless connection, or a combination thereof. In other use cases, however, the AR-HMD device 100 may operate as a standalone device. The connection 104 can be configured to carry any kind of data, such as image data (e.g., still images and/or full-motion video, including 2D and 3D images), audio, multimedia, voice, and/or any other type(s) of data. The processing system 102 may be, for example, a game console, personal computer, tablet computer, smartphone, or other type of processing device. The connection 104 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing system 102 may communicate with one or more other processing systems 106 via a network 108, which may be or include, for example, a local area network (LAN), a wide area network (WAN), an intranet, a metropolitan area network (MAN), the Internet, or a combination thereof.

The AR-HMD device 100 may also include one or more optical mounts 110. The one or more optical mounts 110 may also be referred to herein as an optical waveguide mount 110. However, it is to be understood that the optical waveguide mount 110 may receive optical elements other than waveguides. Specific details of the optical waveguide mount 110 are provided hereinafter.

The AR-HMD device 100 may enclose various sensors and other components (not shown), such as one or more microphones, visible-spectrum head-tracking cameras, infrared (IR) spectrum depth cameras, IR illumination sources, and visible-spectrum video cameras. The AR-HMD device 100 may also enclose electronics (not shown) to control the functionality of the AR-HMD device 100. For example, the AR-HMD device 100 may include display related components, including light sources (e.g., light emitting diodes), imagers (e.g., liquid crystal on silicon devices), lenses, beam splitters and/or additional waveguides, the details of which are not germane to this disclosure.

In some implementations, the AR-HMD device 100 includes a single optical waveguide mount 110 or a plurality of optical waveguide mounts 110. The optical waveguide mount 110 may be adapted to carry an optical waveguide (not shown). Specifically, an optical waveguide may be adhesively or otherwise attached to the optical waveguide mount 110. In some implementations, the optical waveguide mount 110 is made from molded plastic or the like. Specifically, the molded plastic may be a polycarbonate material. However, the optical waveguide mount 110 may be made from other materials, such as an opaque material made from plastic or metal, acrylic, and the like. Furthermore, the optical waveguide mount 110 may be adapted to carry an optical element other than an optical waveguide. For example, the optical waveguide mount 110 may carry a lens, or the like.

The optical waveguide mount 110 may be considered a mounting structure for an optical waveguide. In some implementations, the optical waveguide received by the optical waveguide mount 110 may comprise optical grade glass. However, other materials for the optical waveguide may be used. In some implementations, the optical waveguide comprises a plurality of waveguides stacked on top of each other. For example, an optical waveguide may comprise a plurality of optical grade layers such that there is one waveguide layer for each of the red, green and blue components of an RGB display. However, other color formats and corresponding waveguide configurations may be used instead.

As disclosed in the foregoing, even minor mechanical or thermal stresses applied to the display-related components of the AR-HMD device 100 may affect the positioning, shape and/or alignment of the waveguide(s) and thereby adversely affect the quality of the images generated and/or other functionality of the AR-HMD device 100. For example, a slight curvature, bow, or other deformation of the waveguide(s) can cause the generated images to become distorted, adversely affecting their degree of realism and potentially causing physical discomfort to the user of the AR-HMD device 100. Therefore, in some implementations, the optical waveguide mount 110 implements at least one compliance joint to accommodate mechanical and/or thermal stresses that may be applied to the AR-HMD device 100 and/or the waveguide(s) housed within the AR-HMD device 100. Specifically, the optical waveguide mount 110 may implement at least one compliance joint to mitigate against bowing or warping in a waveguide, which may occur due to stresses (e.g., thermal stresses) caused by components of the AR-HMD device 100. The at least one compliance joint may also mitigate against mechanical stresses, such as jarring forces that may occur if the AR-HMD device 100 is inadvertently dropped.

Figure 2:
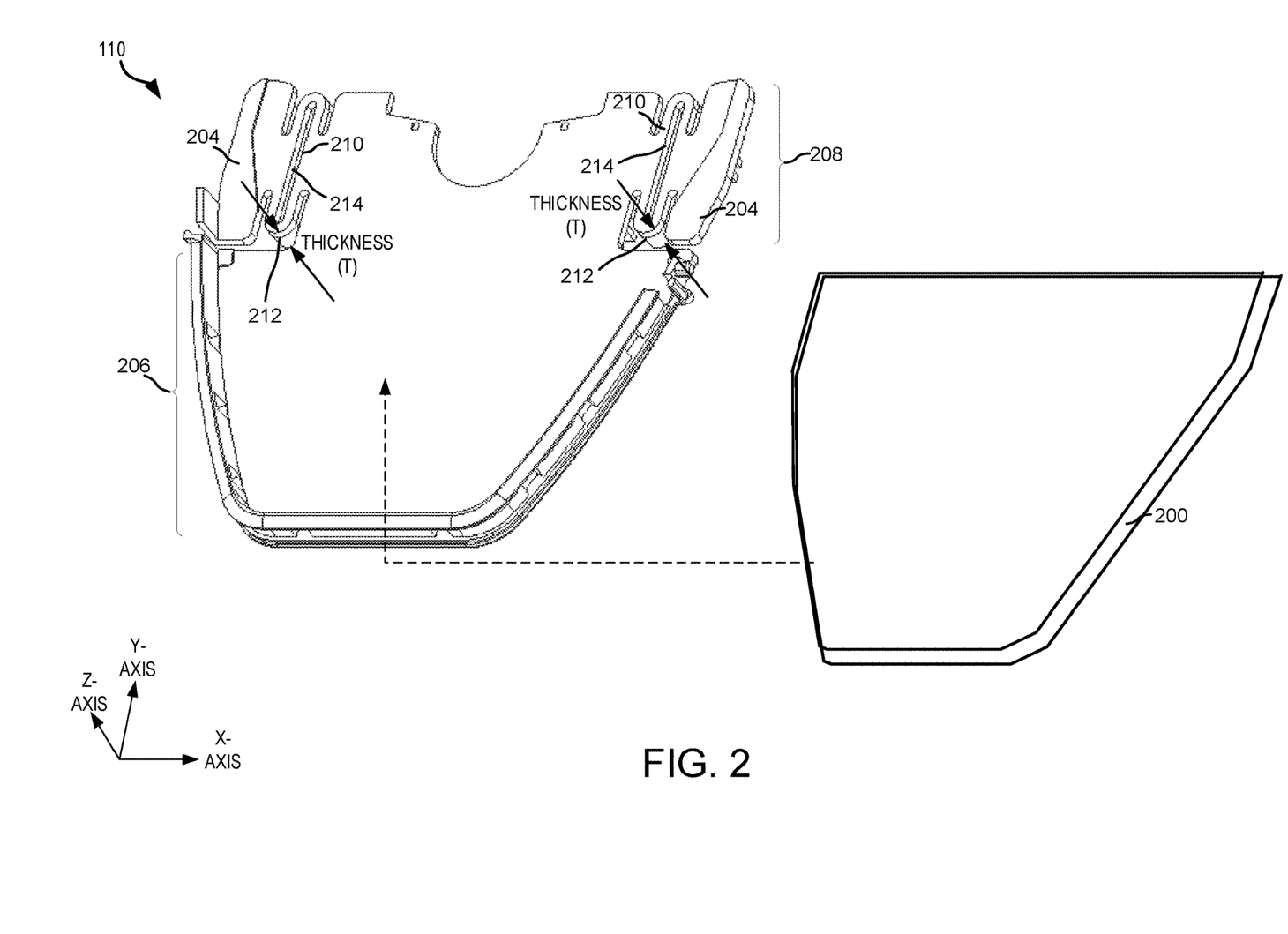
FIG. 2 illustrates an exemplary perspective view of the optical waveguide mount.

FIG. 2 illustrates an exemplary perspective view of the optical waveguide mount 110. In particular, the exemplary perspective view of the optical waveguide mount 110 in FIG. 2 illustrates a perspective top or frontside view of the optical waveguide mount 110.

In general, the optical waveguide mount 110 may receive and carry an optical waveguide 200. Alternatively, the optical waveguide mount 110 may receive and carry an optical element other than a waveguide. The shape of the optical waveguide 200 is exemplary, as the optical waveguide 200 may be manufactured in various shapes and sizes. In some implementations, the optical waveguide 200 comprises a solid structure of optical material. In other implementations, the optical waveguide 200 comprises a plurality of optical layers manufactured from optical material. The optical waveguide 200 may be manufactured using optical grade glass, optical grade plastic, or other transparent or semitransparent material.

As indicated above, in some implementations, the optical waveguide mount 110 is made from molded plastic, or the like. Specifically, the molded plastic may be a polycarbonate material. In some implementations, a body segment 206 of the optical waveguide mount 110 may function as a lens.

In some implementations, the optical waveguide mount 110 has a size and shape that accommodates an overall size and shape of the optical waveguide 200. In other implementations, the optical waveguide mount 110 does not particularly match the overall size and shape of the optical waveguide 200. For example, in some implementations, the optical waveguide mount 110 is manufactured to comprise a body segment 208. Specifically, the optical waveguide mount 110 may be manufactured to omit the body segment 206. The body segments 206 and 208 may be manufactured as a single unit, such as by injection molding or extrusion. In some implementations, the body segments 206 and 208 are separate units that may be coupled together, such as by one or more fasteners and/or adhesives.

The optical waveguide 200 may be mounted to the optical waveguide mount 110 by way of one or more adhesive bearing surfaces 204. Specifically, the adhesive bearing surfaces 204 may receive an adhesive. The optical waveguide 200 may be caused to engage the adhesive disposed on the adhesive bearing surfaces 204, by pressing or the like, to couple the optical waveguide 200 to the optical waveguide mount 110. The illustrated number of adhesive bearing surfaces 204 is merely exemplary, as the optical waveguide mount 110 may employ any number of adhesive bearing surfaces 204. Furthermore, the illustrated location of the adhesive bearing surfaces 204 is exemplary, as the adhesive bearing surfaces 204 may be located at other positions on the optical wave mount 110.

In some implementations, an alternative attaching mechanism may be used to couple the optical waveguide 200 to the optical waveguide mount 110. For example, one or more mechanical fasteners may be used to couple the optical waveguide 200 to the optical waveguide mount 110. In particular, a mechanical fastener may be used at one or more of the surfaces 204 to enable coupling the optical waveguide 200 to the optical waveguide mount 110. Suitable mechanical fasteners include screws, rivets, and the like.

The optical waveguide mount 110 may comprise one or more compliance joints 210. In some implementations, a single compliance joint 210 is implemented by the optical waveguide mount 110. The one or more compliance joints 210 are disposed in the optical waveguide mount 110 to allow the mount 110 to expand and/or retract.

The one or more compliance joints 210 enable the optical waveguide mount 110 to exhibit some elasticity along a first direction (x-axis). The elasticity enabled by the one or more compliance joints 110 isolates or substantially isolates the optical waveguide 200 from stresses (e.g., thermal stresses) that may cause the optical waveguide 200 to bow and/or warp. Such stresses may be associated with the AR-HMD 100 and/or the optical waveguide mount 110. In some implementations, such stresses may be caused by components of the AR-HMD 100 (e.g., electrical components) and/or jarring forces that may be applied to the AR-HMD 100.

In some implementations, the at least one or more compliance joints 210 have a thickness (t) 212 in a second direction (z-axis) that is designed to minimize compliance (i.e., expansion and/or retraction) of the optical waveguide mount 110 in the second direction (z-axis). In some implementations, the second direction (z-axis) is perpendicular or substantially perpendicular to the first direction (x-axis). In general, the optical waveguide mount 110 is to have elasticity or compliance in the first direction (x-axis) and no or minimal elasticity or compliance in the second direction (z-axis). In some implementations, due to the at least one or more compliance joints 210, the optical waveguide mount 110 is at least five times more elastic or compliant in the first direction (x-axis) compared to the elasticity or compliance in the second direction (z-axis).

In some implementations, the one or more compliance joints 210 are formed as elongated circles or ellipses, and each of the one or more compliance joints 210 may have an opening 214 disposed therein. The opening 214 at least partially provides the elasticity or compliance along a first direction (x-axis) of the optical waveguide mount 110. Each of the one or more compliance joints 210 may comprise a shape other than an elongated circle or ellipse. For example, the one or more compliance joints 210 may be formed as an accordion like honeycomb structure, lattice structure, or the like. Elasticity or compliance associated with the optical waveguide mount 110 may be enhanced by locating at least one compliance joint 210 between each pair of adhesive bearing surfaces 204.

The one or more compliance joints 210 may be springs. Specifically, one or more compliance joints 210 embodied as springs may be manufactured integrally as part of the optical waveguide mount 110. In some implementations, one or more compliance joints 210 embodied as springs may be mechanically coupled, such as by fastener or the like, to the body segment 208 associated with the optical waveguide mount 110. Furthermore, in some implementations, the body segment 208 may be made from metal, and the one or more compliance joints 210 may be springs. Such a metal body segment 208 may be manufactured as one unit to include the one or more compliance joints 210 embodied as springs. Alternatively, the metal body segment 208 may be manufactured to include distinct units (e.g., (1) one or more springs and (2) body portions) that are mechanically coupled together to provide a single unit that is the optical waveguide mount 110. In the foregoing, it is to be understood that the optical waveguide mount 110 may be manufactured to include only the body segment 208, or the optical waveguide mount 110 may be manufactured to include the body segment 208 and the body segment 206.

Figure 3:
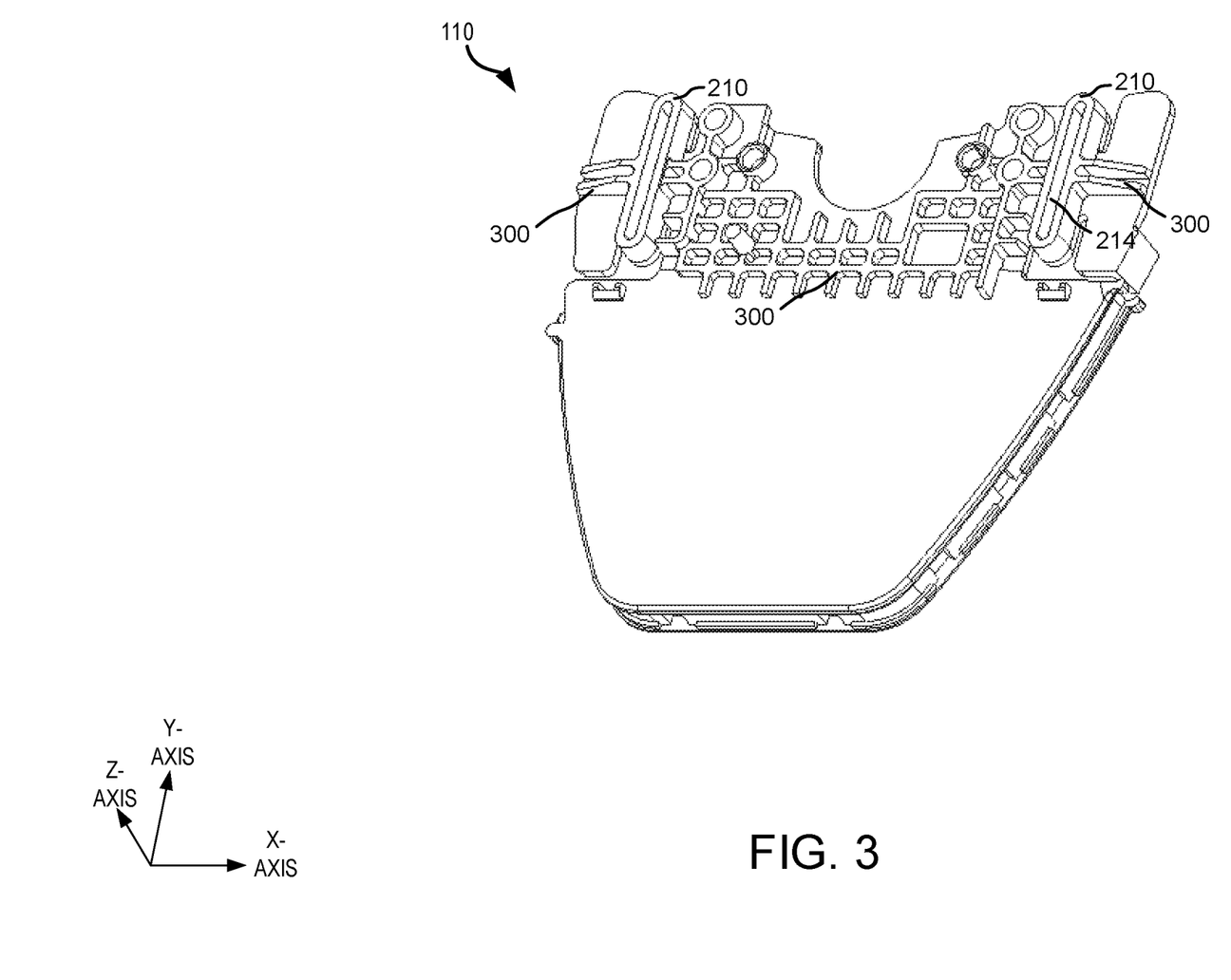
FIG. 3 illustrates another exemplary perspective view of the optical waveguide mount.

FIG. 3 illustrates another exemplary perspective view of the optical waveguide mount 110. In particular, the exemplary perspective view of the optical waveguide mount 110 in FIG. 3 illustrates a bottom or backside view of the optical waveguide mount 110.

As illustrated, the backside of the optical waveguide mount 110 comprises reinforcing members 300. In some implementations, some of the reinforcing members 300 form a crisscross pattern. The reinforcing members 300 aid in preventing or substantially preventing elasticity or compliance of the optical wave mount 110 in the second direction (z-axis).

Figure 4:
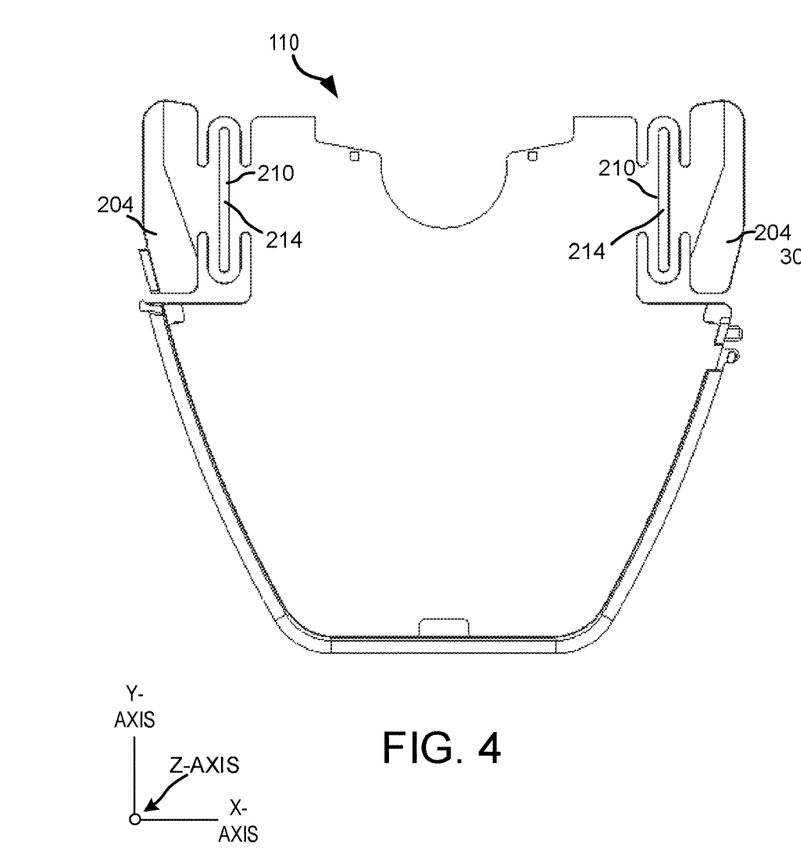
FIG. 4 illustrates a top or frontside view of the optical waveguide mount.
Figure 5:
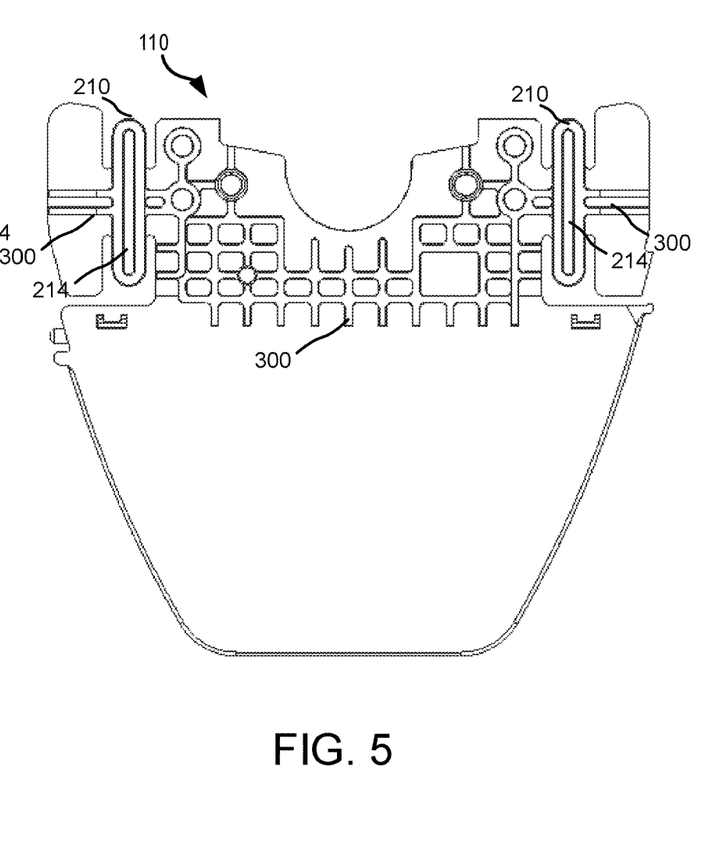
FIG. 5 illustrates a bottom or backside view of the optical waveguide mount.

FIG. 4 illustrates a top or frontside view of the optical waveguide mount 110. FIG. 5 illustrates a bottom or backside view of the optical waveguide mount 110.

Figure 6:
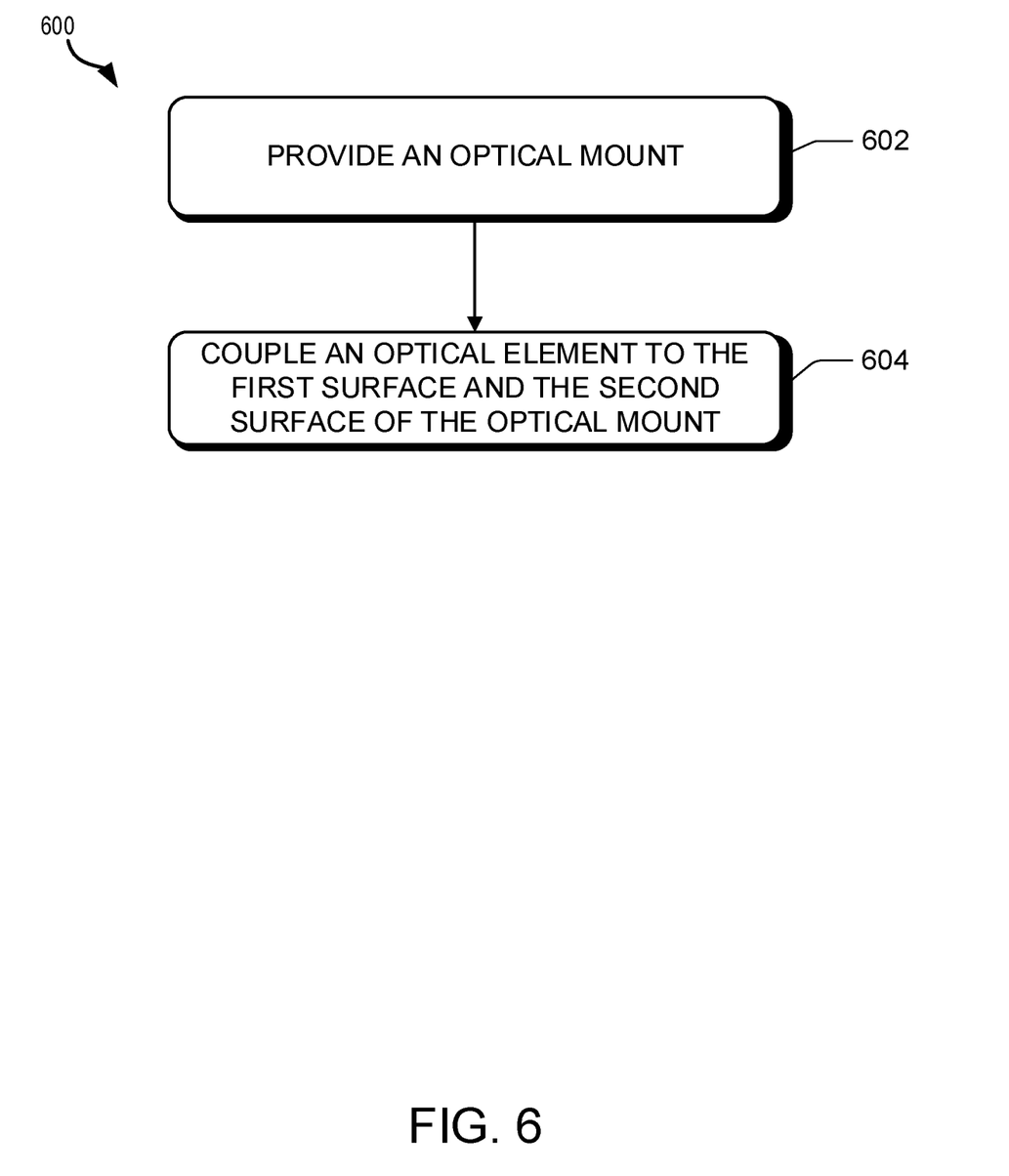
FIG. 6 is a flow diagram of an illustrative process associated with the disclosed optical waveguide mount implementations.

FIG. 6 is a flow diagram of an illustrative process 600 associated with the disclosed optical waveguide mount implementations.

In some implementations, a suitable manufacturing system may implement the process or routine 600. For example, a system for manufacturing AR-HMD devices may implement the process 600 illustrated in FIG. 6. It should be understood that the operations of the methods (e.g., routines and/or processes) disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. Furthermore, it is to be understood that the routine 600 may implement and/or comprise one or more of the components and elements illustrated in FIGS. 1-5 and the related description of those figures.

It also should be understood that the illustrated methods can end at any time and need not be performed in their entireties. Some or all operations of the methods, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based programmable consumer electronics, combinations thereof, and the like.

The operations of the routine 600 may be implemented, at least in part, by an application, component and/or circuit. One or more of the implemented compiled program/application, interpreted program, script or any other executable set of instructions may be executed by at least one processor to cause one or more of the operations of the routine 600 to operate.

At block 602, an optical mount, such as the optical waveguide mount 110, is provided. The optical mount may comprise a first surface and a second surface. Specifically, the optical mount may comprise a plurality of adhesive bearing surfaces 204. Furthermore, the optical mount may comprise at least one compliance joint 210 disposed between the adhesive bearing surfaces 204.

At block 604, an optical element is coupled to the first surface and the second surface of the optical mount. For example, an optical waveguide 200 may be adhesively coupled to the adhesive bearing surfaces 204 of the optical waveguide mount 110. In some implementations, the at least one compliance joint 210 provides an elasticity or compliance in the optical mount to mitigate bowing and/or warping of the optical waveguide 200 due to the stress experienced by the optical waveguide mount 110. Such stress may include thermal stress and/or mechanical stress, or the like.

The disclosure presented herein may be considered in view of the following examples.

Example 1

An optical waveguide mount, comprising: a first body segment to receive and engage an optical waveguide; a first surface and a second surface disposed on the first body segment, the first surface and the second surface to receive and engage the optical waveguide; and at least one compliance joint disposed in the first body segment, the at least one compliance joint disposed between the first surface and the second surface, the at least one compliance joint allowing the first body segment to have an elasticity or compliance in a first direction of the first body segment, the elasticity or compliance designed to mitigate bowing and/or warping of the optical waveguide due to stress experienced by the optical waveguide mount and/or the optical waveguide.

Example 2

The optical waveguide mount according to Example 1, wherein the first surface and the second surface each comprise an adhesive, the adhesives of the first surface and the second surface to fixedly couple the optical waveguide to the first body segment.

Example 3

The optical waveguide mount according to Example 1, wherein the first body segment comprises reinforcing members disposed on a backside of the first body segment, the reinforcing members to mitigate against elasticity or compliance in a second direction of the first body segment, the second direction generally perpendicular to the first direction.

Example 4

The optical waveguide mount according to Example 3, wherein the reinforcing members on the backside of the first body segment form a crisscross pattern on the backside of the first body segment.

Example 5

The optical waveguide mount according to Example 1, wherein the at least one compliance joint is formed as an elongated circle or ellipse, the elongated circle or ellipse having an opening disposed therein.

Example 6

The optical waveguide mount according to Example 1, comprising a second body segment coupled to the first body segment, the second body segment comprising a material that is transparent or semitransparent.

Example 7

The optical waveguide mount according to Example 6, wherein the second body segment is a lens.

Example 8

The optical waveguide mount according to Example 6, wherein the first and second body segments are made from polycarbonate material.

Example 9

The optical waveguide mount according to Example 1, comprising a plurality of compliance joints disposed in the first body segment, the plurality of compliance joints disposed between the first surface and the second surface, the plurality of compliance joints allowing the first body segment to have the elasticity or compliance in the first direction of the first body segment, the elasticity or compliance to mitigate the bowing and/or warping of the optical waveguide due to the stress experienced by the optical waveguide mount and/or the optical waveguide.

Example 10

The optical waveguide mount according to Example 1, wherein the stress experienced by the optical wave mount and/or the optical waveguide is at least thermal stress or mechanical stress.

Example 11

An optical mount, comprising: a first body segment to receive and engage an optical element; a first surface and a second surface disposed on the first body segment, the first surface and the second surface to receive and engage the optical element; and at least one compliance joint disposed in the first body segment, the at least one compliance joint disposed between the first surface and the second surface, the at least one compliance joint allowing the first body segment to have an elasticity or compliance.

Example 12

The optical mount according to Example 11, wherein the at least one compliance joint provides the elasticity or compliance in a first direction of the first body segment, the at least one compliance joint comprising a thickness in a second direction of the first body segment, the second direction perpendicular to the first direction, the thickness in the second direction designed to minimize elasticity or compliance in the second direction of the first body segment.

Example 13

The optical mount according to Example 11, wherein the elasticity or compliance is to mitigate bowing and/or warping of the optical element due to stress experienced by the optical mount and/or the optical element.

Example 14

The optical mount according to Example 11, wherein the optical element is an optical waveguide, the optical waveguide comprising at least one layer of optical grade glass.

Example 15

The optical mount according to Example 11, comprising a plurality of compliance joints disposed in the first body segment, the plurality of compliance joints disposed between the first surface and the second surface, the plurality of compliance joints allowing the first body segment to have an elasticity or compliance in a first direction of the first body segment, the elasticity or compliance to mitigate bowing and/or warping of the optical element in the first direction of the first body segment due to stress experienced by the optical mount and/or the optical element.

Example 16

The optical mount according to Example 11, comprising a second body segment coupled to the first body segment, the second body segment comprising a material that is transparent or semitransparent.

Example 17

A method, comprising: providing an optical mount comprising at least a first surface and a second surface and at least one compliance joint disposed between the first surface and the second surface; and coupling an optical element to the first surface and the second surface, wherein the at least one compliance joint allows the optical mount to have an elasticity or compliance in a first direction of the optical mount, the elasticity or compliance to mitigate bowing and/or warping of the optical element in the first direction of the optical mount due to stress experienced by the optical mount and/or the optical element.

Example 18

The method according to Example 17, wherein a plurality of compliance joints are disposed between the first surface and the second surface.

Example 19

The method according to Example 17, wherein the at least one compliance joint comprises an elongated circle or ellipse, a lattice structure, or an accordion structure.

Example 20

The method according to Example 17, wherein the optical mount comprises a polycarbonate material, the polycarbonate material being a lens for the optical element.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. An optical waveguide mount, comprising:
   a first body segment to receive and engage an optical waveguide;
   a first surface and a second surface disposed on the first body segment, the first surface and the second surface to receive and engage the optical waveguide; and
   at least one compliance joint disposed in the first body segment, the at least one compliance joint formed by the first body section and disposed between the first surface and the second surface, the at least one compliance joint allowing the first body segment to have an elasticity or compliance in a first direction of the first body segment, the elasticity or compliance designed to mitigate bowing and/or warping of the optical waveguide due to stress experienced by the optical waveguide mount and/or the optical waveguide,
   wherein the first surface and the second surface receive and engage a planar surface of the optical waveguide.

2. The optical waveguide mount according to claim 1, wherein the first surface and the second surface each comprise an adhesive, the adhesives of the first surface and the second surface to fixedly couple the optical waveguide to the first body segment.

3. The optical waveguide mount according to claim 1, wherein the first body segment comprises reinforcing members disposed on a backside of the first body segment, the reinforcing members to mitigate against elasticity or compliance in a second direction of the first body segment, the second direction generally perpendicular to the first direction.

4. The optical waveguide mount according to claim 3, wherein the reinforcing members on the backside of the first body segment form a crisscross pattern on the backside of the first body segment.

5. The optical waveguide mount according to claim 1, wherein the at least one compliance joint is formed as an elongated circle or ellipse, the elongated circle or ellipse having an opening disposed therein.

6. The optical waveguide mount according to claim 1, comprising a second body segment coupled to the first body segment, the second body segment comprising a material that is transparent or semitransparent.

7. The optical waveguide mount according to claim 6, wherein the second body segment is a lens.

8. The optical waveguide mount according to claim 6, wherein the first and second body segments are made from polycarbonate material.

9. The optical waveguide mount according to claim 1, comprising a plurality of compliance joints disposed in the first body segment, the plurality of compliance joints disposed between the first surface and the second surface, the plurality of compliance joints allowing the first body segment to have the elasticity or compliance in the first direction of the first body segment, the elasticity or compliance to mitigate the bowing and/or warping of the optical waveguide due to the stress experienced by the optical waveguide mount and/or the optical waveguide.

10. An optical mount, comprising:
    a first body segment to receive and engage an optical element;
    a first surface and a second surface disposed on the first body segment, the first surface and the second surface to receive and engage the optical element; and
    at least one compliance joint disposed in the first body segment, the at least one compliance joint formed by the first body segment and disposed between the first surface and the second surface, the at least one compliance joint allowing the first body segment to have an elasticity or compliance, wherein the first surface and the second surface receive and engage a planar surface of the optical waveguide.

11. The optical mount according to claim 10, wherein the at least one compliance joint provides the elasticity or compliance in a first direction of the first body segment, the at least one compliance joint comprising a thickness in a second direction of the first body segment, the second direction perpendicular to the first direction, the thickness in the second direction designed to minimize elasticity or compliance in the second direction of the first body segment.

12. The optical mount according to claim 10, wherein the elasticity or compliance is to mitigate bowing and/or warping of the optical element due to stress experienced by the optical mount and/or the optical element.

13. The optical mount according to claim 10, comprising a plurality of compliance joints disposed in the first body segment, the plurality of compliance joints disposed between the first surface and the second surface, the plurality of compliance joints allowing the first body segment to have an elasticity or compliance in a first direction of the first body segment, the elasticity or compliance to mitigate bowing and/or warping of the optical element in the first direction of the first body segment due to stress experienced by the optical mount and/or the optical element.

14. The optical mount according to claim 10, comprising a second body segment coupled to the first body segment, the second body segment comprising a material that is transparent or semitransparent.

15. A method, comprising:

providing an optical mount comprising at least a first surface and a second surface and at least one compliance joint disposed in the optical mount and being an integral portion of the optical mount, and the at least one compliance joint disposed between the first surface and the second surface; and coupling an optical element to the first surface and the second surface, wherein the at least one compliance joint allows the optical mount to have an elasticity or compliance in a first direction of the optical mount, the elasticity or compliance to mitigate bowing and/or warping of the optical element in the first direction of the optical mount due to stress experienced by the optical mount and/or the optical element, wherein the first surface and the second surface receive and engage a planar surface of the optical waveguide.

16. The method according to claim 15, wherein a plurality of compliance joints are disposed between the first surface and the second surface.

17. The method according to claim 15, wherein the at least one compliance joint comprises an elongated circle or ellipse, a lattice structure, or an accordion structure.

* * * * *